United States Patent [19]

Tom et al.

[11] Patent Number: 4,761,395

[45] Date of Patent: Aug. 2, 1988

[54] PROCESS AND COMPOSITION FOR PURIFYING ARSINE, PHOSPHINE, AMMONIA, AND INERT GASES TO REMOVE LEWIS ACID AND OXIDANT IMPURITIES THEREFROM

[75] Inventors: Glenn M. Tom, New Milford; Duncan W. Brown, Wilton, both of Conn.

[73] Assignee: Advanced Technology Materials, Inc., New Milford, Conn.

[21] Appl. No.: 29,632

[22] Filed: Mar. 24, 1987

[51] Int. Cl.$^4$ .................. B01J 20/04; B01J 20/16; B01J 20/22

[52] U.S. Cl. .................. 502/401; 502/402; 502/415; 502/416; 502/400; 423/304; 521/28; 521/31; 521/52; 521/53; 525/366

[58] Field of Search ............... 502/401, 400, 402, 415, 502/416; 423/210, 304, 215.5, 245; 521/28, 31, 52, 53; 525/366

[56] References Cited

U.S. PATENT DOCUMENTS

| | | | |
|---|---|---|---|
| 3,079,428 | 2/1963 | Baer et al. | 521/31 |
| 3,316,223 | 4/1967 | Baer et al. | 525/366 |
| 3,542,544 | 11/1970 | Seus et al. | 430/73 |
| 3,542,547 | 11/1970 | Wilson | 430/74 |
| 3,984,253 | 10/1976 | Nelson | 430/280 |
| 4,258,119 | 3/1981 | Cournoyer et al. | 430/227 |
| 4,316,950 | 2/1982 | Cincotta et al. | 430/221 |
| 4,405,704 | 9/1983 | Watarai et al. | 430/74 |
| 4,416,971 | 11/1983 | Borror et al. | 430/221 |
| 4,603,148 | 7/1986 | Tom | 521/28 |

*Primary Examiner*—Anthony McFarlane
*Attorney, Agent, or Firm*—Steven Hultquist

[57] ABSTRACT

A process for purifying a gaseous mixture comprising arsine, phosphine, ammonia, and/or inert gases, to remove Lewis acid and/or oxidant impurities therefrom, comprising contacting the mixture with a scavenger including a support having associated therewith an anion which is effective to remove such impurities, such anion being selected from one or more members of the group consisting of: (i) carbanions whose corresponding protonated compounds have a p$K_a$ value of from about 22 to about 36; and (ii) anions formed by reaction of such carbanions with the primary component of the mixture.

19 Claims, 1 Drawing Sheet

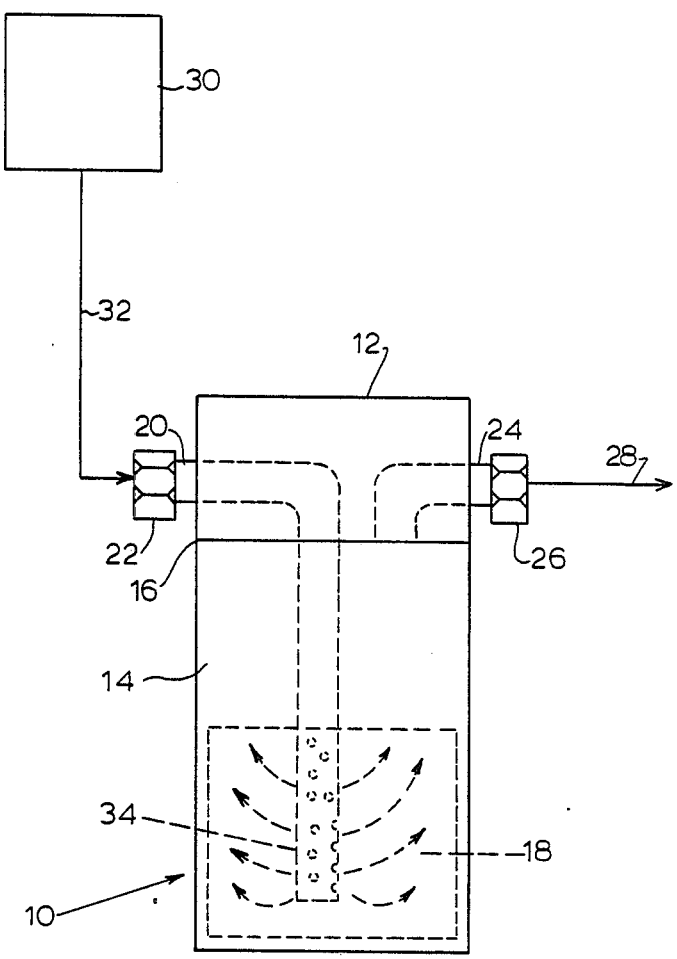

PROCESS AND COMPOSITION FOR PURIFYING ARSINE, PHOSPHINE, AMMONIA, AND INERT GASES TO REMOVE LEWIS ACID AND OXIDANT IMPURITIES THEREFROM

BACKGROUND OF THE INVENTION

1. Field of the Invention

This invention relates generally to a process and composition for removing Lewis acid and oxidant impurities from arsine, phosphine, ammonia, and inert gases.

2. Description of the Related Art

Arsine, phosphine, and ammonia are widely used in the semiconductor industry for the manufacture of microcircuitry devices, as source reagents for elemental arsenic, phosphorus, and nitrogen, respectively.

In such applications, it is critical that the arsine, phosphine, and ammonia source reagents be essentially completely free of impurities such as water and oxygen. Such impurities, when introduced onto the semiconductor chip during its manufacture, tend to produce localized defects in the crystalline structure which may then propagate to produce an undesirable epitaxy, and render the chip deficient or even useless for its intended purpose.

Arsine and phosphine are particularly difficult to purify, due to their extreme toxicity and hazardous character, and the fact that they react detrimentally with many otherwise potentially useful scavengers to poison to active sorption sites of such materials. In addition, arsine and phosphine have a higher affinity for water than they do for inert impurities, e.g., nitrogen, which are less objectionable in the semiconductor manufacturing process.

Although ammonia does not possess the toxicity and handling disadvantages of arsine and phosphine, it nonetheless is a poison to many otherwise potentially useful scavengers, such as those commonly used in redox purification systems for removal of water and oxygen contaminants from other gases.

Among the methods utilized in the prior art for removing water from ammonia are the use of moisture-sorptive molecular sieves. The difficulty of employing such method for production of high-purity ammonia for semiconductor applications is that ammonia is competitive with water for the adsorption sites on the molecular sieves. As a result, it is not possible to obtain the necessary low residual water values, on the order of part-per-million concentrations of water in the effluent from the molecular sieve contacting step.

Ammonia has also been dehydrated by sodium metal followed by distillation, although such methods are complex, costly, and entail the use of strong reducing agents.

Arsine and phosphine have also been treated by molecular sieves to remove water, but such treatment in order to achieve high water removal efficiency requires that the molecular sieve contacting be carried out at low temperatures, e.g., on the order of about −20 degrees Centigrade for arsine. This and other refrigeration-based water removal techniques involve high energy expenditures and operating costs, and therefore are not fully satisfactory.

In addition, trimetal eutectics comprising indium and gallium components, and liquid at room temperatures, have been employed for purifying arsine and phosphine of water impurity, but such dehydration method suffers the disadvantage that substantial amounts of oxide particles are generated in the treatment stream.

Apart from arsine, phosphine, and ammonia, a variety of inert gases are employed in semiconductor manufacturing, for which extremely high purity is also required. As used herein, the term "inert gases" is intended to be broadly construed as being inclusive of gases which may be unreactive in various semiconductor manufacturing operations, and are selected from the group consisting of one or more members of the group consisting of nitrogen, hydrogen, helium, argon, neon, xenon, silane, germane, and gaseous hydrocarbons (methane, ethane, ethylene, propane, propylene, etc.).

Japanese Kokai Tokkyo Koho JP No. 60/222127 discloses the thermal decomposition of trimethyl aluminum to deposit elemental aluminum on a glass substrate, e.g., glass beads, following which the aluminum coating is reacted with arsine to form a scavenger for water and oxygen.

U.S. Pat. No. 4,603,148 to G. M. Tom discloses a macroreticulate polymer scavenger for removing Lewis acid and oxidant impurities from inert fluids such as aliphatic hydrocarbons, olefins, and gases including nitrogen, argon, helium, xenon, hydrogen, carbon tetrafluoride, ammonia, and silane. The macroreticulate polymer backbone of the scavenger has bonded thereto a plurality of functional groups of the formula:

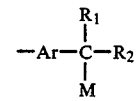

where: Ar is an aromatic hydrocarbon radical of 1-3 rings; $R_1$ and $R_2$ are each independently hydrogen, $C_1$-$C_{12}$ alkyl, methylene-bridged benzophenone, methylene-bridged fluorenone, or alkali or alkaline earth metal salts of such benzophenone or fluorenone radicals; and M is lithium, potassium, sodium, alkyl magnesium, or alkyl zinc, the alkyl substituents being $C_1$-$C_{12}$ alkyl. Within the pores of the macroreticulate polymer is a metallating agent selected from the group consisting of alkyl lithium, alkyl sodium, alkyl potassium, dialkyl magnesium, alkyl magnesium halide, dialkyl zinc, wherein the alkyl moiety is $C_1$-$C_{12}$ alkyl; alkali or alkaline earth metal salts of benzophenone; and alkali or alkaline earth metal salts of fluorenone.

It is an object of the present invention to provide a highly efficient composition and process for removing Lewis acid and oxidant impurities from arsine, phosphine, ammonia, and inert gases.

It is another object of the invention to provide a composition and process of such type, which when employed to dry arsine, phosphine, ammonia, and inert gas streams, is capable of reducing the water content of the treated stream to levels on the order of 0.01 part per million by volume and less.

Other objects and advantages of the invention will be more fully apparent from the ensuing disclosure and appended claims.

SUMMARY OF THE INVENTION

In one aspect, the invention relates to a process for purifying a gaseous mixture comprising (i) a primary component selected from one or more members of the group consisting of arsine, phosphine, ammonia, and inert gases, and (ii) impurities selected from one or more members of the group consisting of Lewis acids and oxidants, to remove such impurities therefrom, comprising:

contacting the mixture with a scavenger including a support having associated therewith, but not covalently bonded thereto, an anion which is reactive to effect the removal of the impurities, such anion being selected from the group consisting of one or more members of the group consisting of:
  (i) carbanions source compounds whose corresponding protonated compounds have a $pK_a$ value of from about 22 to about 36; and
  (ii) anions formed by reaction of the aforementioned carbanions with the primary component of the mixture.

As used herein, "carbanion source compounds whose corresponding protonated carbanion compounds have a $pK_a$ value of from about 22 to about 36" refers to compounds which in the presence of the impurity-containing mixture provide a carbanion which is directly or indirectly reactive to effect the removal of impurity constituents, i.e., the carbanion provided by such compound either itself reacts with the impurity species to remove same from the mixture, or else the carbanion provided by the compound reacts with a primary component of the mixture, viz., arsine, phosphine, or ammonia, to yield an anion source compound, an arsenide, phosphide, or amide compound, which in turn reacts with the impurity species to remove same from the mixture. It will be appreciated that when the primary component of the impurity-containing mixture is an inert gas, only the carbanion source compounds will be the impurity-removing compounds, i.e., the inert gas, since it is inert, will not react with the carbanion source compounds to form any anion source compounds.

The carbanion source compound thus comprises a cation and an associated carbanion moiety. This carbanion moiety when protonated, forms a corresponding protonated carbanion compound having a $pK_a$ value of from about 22 to about 36.

As used herein, the $pK_a$ value of a compound refers to the $pK_a$ numerical value determined in accordance with the procedure described in A. Streitwieser and J. H. Hammons, *Prog. Phys. Org. Chem.*, 3, 41 (1965), in a solvent medium in which fluorene and diphenylmethane, as reference compounds, have $pK_a$ values of about 22.6 and 34.1, respectively.

Another aspect of the invention relates to a scavenger, having utility for purifying a gaseous mixture as described hereinabove in connection with the broad method aspect of the invention, comprising:
  (a) a support; and
  (b) associated with, but not covalently bonded to, the support, an anion which is reactive to effect the removal of aforementioned impurities therein, the anion being selected from one or more members of the group consisting of:
    (i) carbanions whose corresponding protonated compounds have a $pK_a$ value of from about 22 to about 36; and
    (ii) anions formed by reaction of the carbanions with the primary component of the mixture.

Still another aspect of the invention relates to an apparatus for purifying a mixture of the aforementioned type, comprising:
  (a) a vessel containing a bed of the above-described scavenger;
  (b) means for introducing the mixture to the vessel for passage through the bed therein; and
  (c) means for discharging impurity-depleted mixture from the vessel.

Other aspects and features of the invention will be more fully apparent from the ensuing disclosure and appended claims.

BRIEF DESCRIPTION OF THE DRAWING

The single drawing is a schematic representation of a vessel containing a bed of a scavenger according to one embodiment of the invention, and an associated source of an impurity-containing mixture which is purified by passage through such vessel.

DETAILED DESCRIPTION OF THE INVENTION, AND PREFERRED EMBODIMENTS THEREOF

The scavengers of the present invention utilize compounds which in the presence of Lewis acid and/or oxidant impurities in one or more of arsine, phosphine, ammonia, and inert gases, furnish an anion which reacts either directly with the impurities to remove same from the primary component material, or (for arsine, phosphine, and/or ammonia) indirectly, by deprotonating the arsine, phosphine, and/or ammonia primary component, to form a corresponding arsenide, phosphide, and/or amide anion which in turn reacts with the impurities to remove same from the primary component.

The impurities which may potentially be removed from the arsine, phosphine, and/or ammonia primary component in the broad practice of the invention, depending on the choice of the anions employed in the scavenger, include, but are not limited to, water, oxygen, carbon oxides, alcohols, aldehydes, ketones, as well as any other Lewis acid or oxidant species which are removable by reaction with anions which meet the criteria of the invention, i.e., anions selected from one or more members of the group consisting of:
  (i) carbanions whose corresponding protonated compounds have a $pK_a$ value of from about 22 to about 36; and
  (ii) anions formed by reaction of such carbanions with the primary component of the mixture.

As used herein, "Lewis acid" is a substance which can take up an electron pair to form a bond.

The anion which is employed in the scavenger of the invention is physically associated with a suitable support which is compatible with the anion as well as the impurity-containing mixture. The anion is not covalently bonded to the support, as are the metallated functional groups in the previously described Tom U.S. Pat. No. 4,603,148. The type of non-covalently bonded association of the anion with the support is not critical; the anion may for example be dispersed throughout the support matrix in the form of particulates or agglomerates, as a film or plating on the support, or otherwise localized in pores of the support.

As indicated, the anion may be (i) a carbanion whose corresponding protonated compound has a $pK_a$ value of from about 22 to about 36, (ii) an anion formed by reaction of the carbanion with a primary component of the mixture to be contacted with the scavenger, or (iii) a combination of anions (i) and (ii).

The scavenger may conveniently be formed from a suitable support material, the support being more fully described hereinafter, by applying to the support the aforementioned protonated carbanion compound having a $pK_a$ value of from about 22 to about 36, so that such compound is associated with the support, followed by reaction of the associated compound with a suitable reactant serving to deprotonate the compound and yield the aforementioned carbanion as a reaction product associated with the support.

The deprotonating co-reactant may be any suitable material yielding the desired reaction product. Preferred co-reactant materials include organometallic compounds such as alkyl lithium, alkyl sodium, alkyl potassium, dialkyl magnesium, alkyl magnesium halide, and dialkyl zinc, wherein the alkyl radical contains 1 to 12, and preferably 1 to 8, carbon atoms. A particularly preferred organometallic compound for such purpose is butyllithium, with alkyl or dialkyl metal compounds being a most preferred co-reactant class.

Accordingly, for the aforementioned most preferred co-reactant class of alkyl or dialkyl metal compounds, the resulting carbanion is present as an anionic moiety of a source compound of the formula MA, where: M is lithium, sodium, potassium, alkyl magnesium, or alkyl zinc; and A is a carbanion, i.e. an ionic moiety derived from the protonated carbanion compound.

The selection criteria for the protonated carbanion compound as a precursor of the carbanion of the scavenger is now described with reference to Table I below, in which $pK_a$ values are set forth for various compounds, including anions and dianions of arsine and phosphine, as well as the corresponding log values of the equilibrium constants for arsine (A), phosphine (P), and water ($H_2O$) for reference.

TABLE I

| Compound | $pK_a$ | $logK_{eq}$ (A) | $logK_{eq}$ (P) | $logK_{eq}$ ($H_2O$) |
|---|---|---|---|---|
| Diphosphide= | 42 | — | — | 27 |
| Butane | 42 | 16 | 14 | 27 |
| Diarside= | 40 | — | — | 25 |
| Methane | 40 | 14 | 12 | 25 |
| Benzene | 37 | 11 | 9 | 22 |
| Phosphide− | 37 | — | — | 22 |
| Ethylene | 36.5 | 10.5 | 8.5 | 21.5 |
| Propylene | 36.5 | 10.5 | 8.5 | 21.5 |
| Toluene | 35 | 9 | 7 | 20 |
| Arsenide− | 35 | — | — | 20 |
| Diphenylmethane | 34.1 | 8.1 | 6.1 | 19.1 |
| Triphenylmethane | 32.5 | 4.5 | 2.5 | 18.5 |
| Phosphine | 28 | — | — | — |
| Xanthene | 27.1 | 1.1 | −0.9 | 12.1 |
| Arsine | 26 | — | — | — |
| Fluorene | 22.6 | −3.4 | −5.4 | 7.6 |
| 9-Phenylfluorene | 18.5 | −7.5 | −9.5 | 3.5 |
| Indene | 18.2 | −7.8 | −9.8 | 3.2 |

The foregoing tabulation listing is not inclusive of all possible compounds in the range of $pK_a$ values given, and other compounds within the aforementioned range of $pK_a$ of from about 22 to about 36 may be suitably utilized in the practice of the invention as precursors for, or protonated analogs of, useful carbanion source compounds.

With reference to permissible $pK_a$ values and the carbanion precursors shown in Table I above, the scavengers of the present invention comprise two distinct types: a first type (Type I) in which the carbanion is substantially non-reactive with the primary component, arsine, phosphine, ammonia, and/or inert gases, so that the carbanion is the active scavenging moiety which reacts with the impurities in the primary component, and a second type (Type II), applicable only to arsine, phosphine, and/or ammonia as the primary component, in which the carbanion reacts with the primary component and forms an arsenide, phosphide, and/or amide as the active scavenging moiety which reacts with the impurities in the primary component.

With reference to their $pK_a$ values, the anions of the compounds shown in Table I must satisfy distinct criteria as regards their suitability for use in Type I and Type II scavengers. The $pK_a$ value is the negative logarithm of the acidity constant of a given material, so that increasing values of $pK_a$ indicate increasing basicity.

At the lower end of the $pK_a$ range, the $pK_a$ value of the scavenger anion must be at least about 22, in order that the scavenger anion is sufficiently basic to react with and remove water as an impurity in the mixture being contacted with the scavenger.

At the upper end of the $pK_a$ range, the $pK_a$ value of the scavenger anion must not be so great that it doubly deprotonates the primary component to form dianions therefrom, e.g., diarside or diphosphide anions, since undesirable side reactions are thereby promoted such as the generation of hydrogen gas.

As applied to arsine, the only suitable Type I scavenger anion precursor (corresponding protonated carbanion source compound) in Table I is fluorene, having a $pK_a$ value of 22.6. The fluorene anion, when present with arsine, will only deprotonate about 0.04% of proton sites of the arsine; such anion in moisture-containing arsine yields an equilibrium water vapor pressure of about 0.6 parts-per-million (ppm) on a volume basis.

For phosphine, the suitable Type I scavenger anion precursors in Table I are fluorene and xanthene. In moisture-containing phosphine, the xanthene anion will yield a residual water concentration of less than 1.0 part-per-billion (ppb) on a volume basis.

In the case of arsine and Type II scavengers derived from the anions of the Table I compounds, diphenylmethane, with a $pK_a$ value of 34.1, is the limiting anion compound, and the suitable anion compounds are xanthene, phosphine, triphenylmethane, and diphenylmethane. In the case of diphenylmethane, some deprotonation of the monoanion of arsenide will occur, and the fraction of the arsenic in the dianion state will be about 11%. Residual arsine after deprotonation by the diphenylmethane anion is estimated to be 0.2 ppm by volume, and residual water concentration after scavenging by the arsenide anion will be very low at 2.4 ppb by volume.

In phosphine purification applications, the Type II scavenger precursors in Table I will be limited at the upper end of the $pK_a$ range by toluene, having a $pK_a$ value of 35. Useful Type II scavenger precursors from among those listed in Table I will thus include phosphine, triphenylmethane, diphenylmethane, and toluene. When the toluene anion is utilized as a reactant to form phosphide anion as the scavenger, about 10% of the phosphorus may end up as dianion, while residual phosphine will be on the order of about 2.4 ppm by volume, and water concentration after scavenging will be expected to be less than 1 ppb by volume.

A basic requirement of the scavenger in the practice of the invention, consistent with the residual water concentration values given above in connection with the illustrative arsine and phosphine scavenger anions, is that the vapor pressure of the scavenger and non-primary component reaction products of the impurity-scavenging reaction(s) be very low, preferably below about 1 ppm by volume, and most preferably below about 0.1 ppm by volume, to insure that the gas stream being purified is not contaminated by the scavenger or scavenging reaction products. This vapor pressure criterion is particularly important in the case of hydrocarbons, except of course in the case where gaseous hydrocarbons are the primary component of the gas mixture being purified.

In instances where arsine, phosphine, or ammonia is the primary component, and such primary component is being purified by its corresponding monoanion as the active scavenging entity, the protonation of such monoanion in the scavenging reaction will advantageously produce the primary component as a reaction product. Accordingly, it is only the non-primary component reaction products of the scavenging reaction which are of concern vis-a-vis their vapor pressure.

Thus, there exists a narrow range of $pK_a$ values associated with compounds whose anions are useful to form scavengers for the purification of arsine, phosphine, ammonia, and inert gases. Although ammonia and inert gases have not been illustratively addressed in the preceding discussion of exemplary scavengers and anion species, it will be apparent to those skilled in the art that similar considerations are applicable and that based on such considerations suitable scavengers and related anion species may readily be determined without undue experimentation.

When a Type II scavenger is to be utilized for gas purification in accordance with the invention, it will of course be permissible to utilize on the scavenger support the carbanion which is reactive with the primary component gas, arsine, phosphine, and/or ammonia, to form the actual scavenging anion, i.e., arsenide, phosphide, and/or amide, in situ during gas treatment. Such a scavenger, comprising a support and the reactant carbanion is referred to as an "unconditioned" scavenger, while if this scavenger is pre-reacted with the primary component gas to form the actual scavenging anion species on the support, the resulting scavenger is referred to as a "preconditioned" scavenger.

The supports useful in the scavengers of the present invention include any suitable materials which are compatible with the gas mixtures being purified, and the reaction products of the impurity removal, and any intermediates involved with conditioning or otherwise preparing the scavenger, and which are stable under the conditions of use.

Illustrative materials which may be potentially useful in the broad practice of the invention include materials such as macroreticulate polymers, aluminosilicates, alumina, silica, kieselguhr, and carbon. As used herein, the term "aluminosilicates" means a support composition including the elements aluminum, silicon, and oxygen, such as molecular sieves; such aluminosilicates may be natural or synthetic in character.

Among the macroreticulate polymers which may be useful in the broad practice of the invention are those formed from monomers such as styrene, vinyltoluene, vinylisopropylbenzene, vinyl naphthalene, alpha-methylstyrene, beta-methylstyrene, and mixtures thereof. Such polymers may suitably be polymerized in the presence of a cross-linking agent such as divinylbenzene or divinylnaphthalene.

A particularly preferred macroreticulate polymer is poly (styrene-divinylbenzene), commercially available as Amberlite XAD4 (50 Angstrom pore size) and Amberlite XAD2 (100 Angstrom pore size), from Rohm & Haas, Philadelphia, Pa.

The preferred characteristics of supports which are useful for scavengers of the invention include (a) high surface area, for example a surface area in the range of from about 50 to about 1000 square meters per gram of support, (b) high porosity, such as a significant porosity from pores of a diameter in the range of from about 3 to about 200 Angstroms, and (c) good thermal stability, e.g., thermally stable at temperatures up to about 250 degrees Centigrade.

The scavengers of the invention may be readily formed into a bed through which the impurity-containing gas mixture is flowed for purification thereof, thereby providing a highly efficient removal system for substantially eliminating water and other impurities from arsine, phosphine, ammonia, and/or inert gases. Suitable scavengers according to the invention, utilizing anions derived from the compounds of Table I herein on supports such as the aforementioned Amberlite materials, may variously provide water removal capacity of from about 0.5 to about 20 liters of gaseous water per liter of bed of the scavenger. In some instances where the impurity-removing reactions are highly exothermic in character, it may be desirable to utilize a removal capacity, based on water, of from about 1 to about 5 liters gaseous water per liter of bed of the scavenger.

The impurity removal capacity of the bed may of course be readily adjusted to a particular desired level by controlling the loading of the scavenger anion on the support in the impregnation or other fabrication step by which the carbanion is applied to the support.

The single drawing hereof shows a schematic representation of an apparatus for carrying out the purification method of the invention.

The vessel 10 comprises an upper cylindrically shaped block 12 joined to the cup-like receptacle 14 by means of circumferentially extending weld 16. In the lower portion of receptacle 14 is disposed a bed 18 of the scavenger according to the present invention.

The vessel features means for introducing impurity-containing gas mixture, comprising as a primary component one or more of arsine, phosphine, ammonia, and/or inert gases, into the interior space of the receptacle 14 for contact with the scavenger in bed 18. Such introduction means comprise the conduit 20, provided at its exterior end with an appropriate fitting 22 for joining with the supply line 32 to gas mixture source 30. The conduit 20 passes through the block 12 as shown, in a generally horizontal direction toward the center of the block and then downwardly extending from the block into the bed 18. At its lower portion in contact with the bed, this conduit has a plurality of gas distribution openings 34, through which the gas mixture flows outwardly and upwardly through the scavenger in the bed.

Above the bed in the receptacle 14, the impurity-depleted gas flows into the outlet conduit 24, provided with a suitable fitting 26 for connection to the product gas discharge line 28, from which the purified gas may be supplied to a downstream end-use processing facility.

The advantages of the invention are more fully illustrated with reference to the following examples.

EXAMPLE I

A suitable quantity of Amberlite XAD4 is introduced to a flask and sized by washing with tap water to remove fines. The sized polymer is then washed in sequence with deionized water, methanol, isopropanol, and hexane, each in an amount equal to twice the volume of the bed of polymer.

The polymer is air dried, and then dried with nitrogen at 150-190 degrees Centigrade overnight to remove solvent.

Triphenylmethane is dissolved in toluene, and the polymer bed is flooded with the resulting solution to apply the carbanion precursor at a loading of 10 grams of triphenylmethane per liter of bed. Solvent then is removed from the bed with nitrogen at 120 degrees Centigrade.

Next, butyllithium in hexane solvent is added to the bed to form the carbanion source compound, triphenylmethyllithium, following which solvent is removed from the bed and the unconditioned scavenger is packed under inert atmosphere into a suitable vessel.

If desired, the scavenger in the vessel is then conditioned for service as a moisture scavenger for arsine by blowing helium gas containing on the order of 1-2 volume percent arsine through the scavenger bed in a stoichiometric amount to carry out the exothermic reaction of triphenylmethyllithium with arsine to form lithium arsenide and triphenylmethane. The exit gas from this conditioning step is scrubbed with hypochlorite, and the scavenger bed then is swept with inert gas to remove any free arsine remaining in the bed.

Lithium arsenide thus is formed as the anion source compound in the scavenger, with the arsenide anion from such compound serving as the active water gettering moiety when the vessel is placed in active service to purify water-containing arsine.

EXAMPLE II

The efficacy of a scavenger bed constructed in accordance with Example I is evaluated by flowing therethrough an arsine stream containing 40 ppm water, at a flow rate providing 1000 volumes of the wet arsine gas per volume of scavenger bed per hour.

The effluent from the bed is measured for moisture content by a DuPont 5700 Trace Moisture Analyzer, and yields a moisture content of less than 0.01 ppm water.

EXAMPLE III

Capacity of a scavenger bed constructed in accordance with Example I is measured by flowing therethrough a stream of nitrogen containing 200 ppm of water. The effluent is measured by the same moisture analyzer device as is employed in Example II.

Operation is continued until breakthrough of the water front occurs, by measurement of the water concentration of the effluent gas as a function of time. The water removal capacity of the scavenger bed is between 1 and 5 liters of gaseous water per liter of bed.

Corresponding measurements on oxygen-containing streams indicate an oxygen removal capacity for the scavenger bed of from about 0.5 to about 3 liters of oxygen per liter of bed.

While preferred embodiments of the invention have been described in detail, it will be appreciated that other variations, modifications, and embodiments are possible, and accordingly, all such variations, modifications, and embodiments are to be regarded as being within the spirit and scope of the present invention.

What is claimed is:

1. A scavenger, having utility for purifying a gaseous mixture comprising (i) a primary component selected from one or more members of the group consisting of arsine, phosphine, ammonia, and inert gases, and (ii) impurities selected from one or more members of the group consisting of Lewis acids and oxidants, said scavenger comprising:
   (a) a support having a surface area in the range of from about 50 to about 1000 square meters per gram of support; and
   (b) associated with, but not covalently bonded to, said support, an anion which is reactive to effect the removal of said impurities from said gaseous mixture, said anion being selected from one or more members of the group consising of:
      (1) carbanions whose corresponding protonated compounds have a $pK_a$ value of from about 22 to about 36; and
      (2) anions formed by reaction of said carbanions with the primary component of said mixture.

2. A scavenger according to claim 1, wherein said support is a material selected from the group consisting of macroreticulate polymers, aluminosilicates, alumina, silica, kieselguhr, and carbon.

3. A scavenger according to claim 1, wherein said support is a macroreticulate polymer formed from monomers selected from the group consisting of styrene, vinyltoluene, vinylisopropylbenzene, vinylnaphthalene, alpha-methylstyrene, beta-methylstyrene, and mixtures thereof.

4. A scavenger according to claim 3, wherein the polymer has been formed by polymerization of said monomer in the presence of a cross-linking agent selected from the group consisting of divinylbenzene and divinylnaphthalene.

5. A scavenger according to claim 1, wherein said support is poly(styrene-divinylbenzene).

6. A scavenger according to claim 1, wherein the support has pores of a diameter in the range of from about 3 to about 200 Angstroms, and is thermally stable at least up to about 250 degrees Centigrade.

7. A scavenger according to claim 1, having a water removal capacity of from about 0.5 to about 20 liters gaseous water per liter of a bed of said scavenger.

8. A scavenger according to claim 1, wherein said anion is a carbanion whose corresponding protonated compound has a $pK_a$ value of from about 22 to about 36, said carbanion being directly reactive with said impurities.

9. A scavenger according to claim 8, wherein the corresponding protonated carbanion compound is selected from the group consisting of fluorene, xanthene, triphenylmethane, and diphenylmethane.

10. A scavenger according to claim 8, wherein carbanion is protonatable by Lewis acid impurities during contacting of the mixture with said scavenger.

11. A scavenger according to claim 8, wherein the carbanion is present as an anionic moiety of a compound of the formula MA, where M is a metal or organometal; and A is said carbanion.

12. A scavenger according to claim 8, wherein said scavenger in contact with the mixture is substantially non-deprotonating with respect to the primary component therein.

13. A scavenger according to claim 8, wherein the anion comprises a carbanion selected from the group consisting of fluorene carbanions and xanthene carbanions.

14. A scavenger according to claim 1, wherein said anion is formed by reaction of a said carbanion with the primary component, and said primary component is selected from one or more members of the group consisting of arsine, phosphine, and ammonia.

15. A scavenger according to claim 1, wherein said anion is selected from the group consisting of arsenide and phosphide anions.

16. A scavenger according to claim 1, wherein said anion is selected from one or more members of the group consisting of:
   (1) carbanions present as anionic moieties of compounds of the formula MA, where: M is a metal or organometal, and A is said carbanion; and
   (2) anions formed by reaction of said carbanions with said primary components.

17. A scavenger according to claim 16, wherein A is a carbanion formed by deprotonation of a precursor compound selected from the group consisting of fluorene, xanthene, diphenylmethane, and triphenylmethane.

18. A scavenger according to claim 16, wherein said anion is a carbanion derived from a compound of the formula MA, where M is lithium and A is triphenylmethide.

19. A scavenger according to claim 16, wherein said anion is formed by reaction of said primary component with a carbanion derived from a compoung of the formula MA, where M is lithium and A is triphenylmethide.

* * * * *